US011726590B2

(12) United States Patent
Jiang et al.

(10) Patent No.: US 11,726,590 B2
(45) Date of Patent: Aug. 15, 2023

(54) METHODS AND APPARATUS TO FACILITATE USER INTERACTIONS WITH FOLDABLE DISPLAYS

(71) Applicant: Intel Corporation, Santa Clara, CA (US)

(72) Inventors: Jun Jiang, Portland, OR (US); Russell Beauregard, Portland, OR (US); Saara Kamppari-Miller, Portland, OR (US); Vivek Paranjape, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/701,898

(22) Filed: Mar. 23, 2022

(65) Prior Publication Data

US 2022/0214757 A1 Jul. 7, 2022

Related U.S. Application Data

(63) Continuation of application No. 17/378,359, filed on Jul. 16, 2021, now Pat. No. 11,294,486, which is a continuation of application No. 16/721,031, filed on Dec. 19, 2019, now Pat. No. 11,079,867.

(51) Int. Cl.
*G06F 3/041* (2006.01)
*G06F 3/0488* (2022.01)

(52) U.S. Cl.
CPC ............ *G06F 3/041* (2013.01); *G06F 3/0488* (2013.01); *G06F 2203/04102* (2013.01); *G06F 2203/04108* (2013.01)

(58) Field of Classification Search
CPC ................... G06F 3/041; G06F 3/0488; G06F 2203/04102; G06F 2203/04108
See application file for complete search history.

(56) References Cited

U.S. PATENT DOCUMENTS

| 10,712,862 B1 | 7/2020 | Kang et al. |
| 11,079,867 B2 | 8/2021 | Jiang et al. |
| 2008/0278450 A1 | 11/2008 | Lashina |

(Continued)

FOREIGN PATENT DOCUMENTS

| EP | 2905693 | 8/2015 |
| EP | 2998850 | 3/2016 |
| EP | 3564799 | 11/2019 |

OTHER PUBLICATIONS

United States Patent and Trademark Office, "Non-Final Office Action," issued in connection with U.S. Appl. No. 16/721,031, dated Sep. 24, 2020, 8 pages.

(Continued)

*Primary Examiner* — Kenneth B Lee, Jr.
(74) *Attorney, Agent, or Firm* — Hanley, Flight & Zimmerman, LLC

(57) ABSTRACT

Methods and apparatus to facilitate user interactions with foldable displays are disclosed. An electronic device includes a display, an array of transmitters to extend across the display in a first direction, and an array of receivers to extend across the display in a second direction different than the first direction. The transmitters and receivers to enable detection of at least one of a hover event or a touch event in an area of the display. The receivers to extend less than a full distance across the display.

19 Claims, 8 Drawing Sheets

(56) References Cited

U.S. PATENT DOCUMENTS

| | | | |
|---|---|---|---|
| 2015/0049041 A1* | 2/2015 | Yousefpor | G06F 3/0445 345/174 |
| 2015/0309691 A1* | 10/2015 | Seo | H04M 1/0241 345/173 |
| 2016/0014881 A1 | 1/2016 | Shin et al. | |
| 2016/0109960 A1 | 4/2016 | Steinle et al. | |
| 2016/0328042 A1 | 11/2016 | Chang et al. | |
| 2017/0102738 A1* | 4/2017 | Park | G06F 3/04883 |
| 2017/0131809 A1 | 5/2017 | Lin et al. | |
| 2020/0125194 A1 | 4/2020 | Jiang et al. | |

OTHER PUBLICATIONS

United States Patent and Trademark Office, "Notice of Allowance and Fee(s) Due," issued in connection with U.S. Appl. No. 16/721,031, dated Apr. 9, 2021, 9 pages.

United States Patent and Trademark Office, "Notice of Allowability," issued in connection with U.S. Appl. No. 16/721,031, dated Apr. 23, 2021, 5 pages.

United States Patent and Trademark Office, "Corrected Notice of Allowability," issued in connection with U.S. Appl. No. 16/721,031, dated May 24, 2021, 5 pages.

European Patent Office, "Extended European Patent Search," issued in connection with European patent application No. 20194489.9, dated Mar. 15, 2021, 15 pages.

United States Patent and Trademark Office, "Corrected Notice of Allowability," issued in connection with U.S. Appl. No. 17/378,359, dated Feb. 2, 2022, 5 pages.

United States Patent and Trademark Office, "Notice of Allowance and Fee(s) Due," issued in connection with U.S. Appl. No. 17/378,359, dated Dec. 8, 2021, 2 pages.

* cited by examiner

METHODS AND APPARATUS TO FACILITATE USER INTERACTIONS WITH FOLDABLE DISPLAYS

FIELD OF THE DISCLOSURE

This patent arises from a continuation of U.S. patent application Ser. No. 17/378,359, which was filed on Jul. 16, 2021, which is a continuation of U.S. patent application Ser. No. 16/721,031, which was filed on Dec. 19, 2019. U.S. patent application Ser. No. 17/378,359 and U.S. patent application Ser. No. 16/721,031 are incorporated herein by reference in their entireties. Priority to U.S. patent application Ser. No. 17/378,359 and U.S. patent application Ser. No. 16/721,031 is claimed.

FIELD OF THE DISCLOSURE

This disclosure relates generally to foldable displays, and, more particularly, to methods and apparatus to facilitate user interactions with foldable displays.

BACKGROUND

In recent years, computing devices with foldable displays have been developed that enable a display to be folded into different configurations (e.g., two halves of a display may be folded on top of each other). Foldable displays enable relatively large display screens without compromising portability of the associated computing device.

Figure 1:
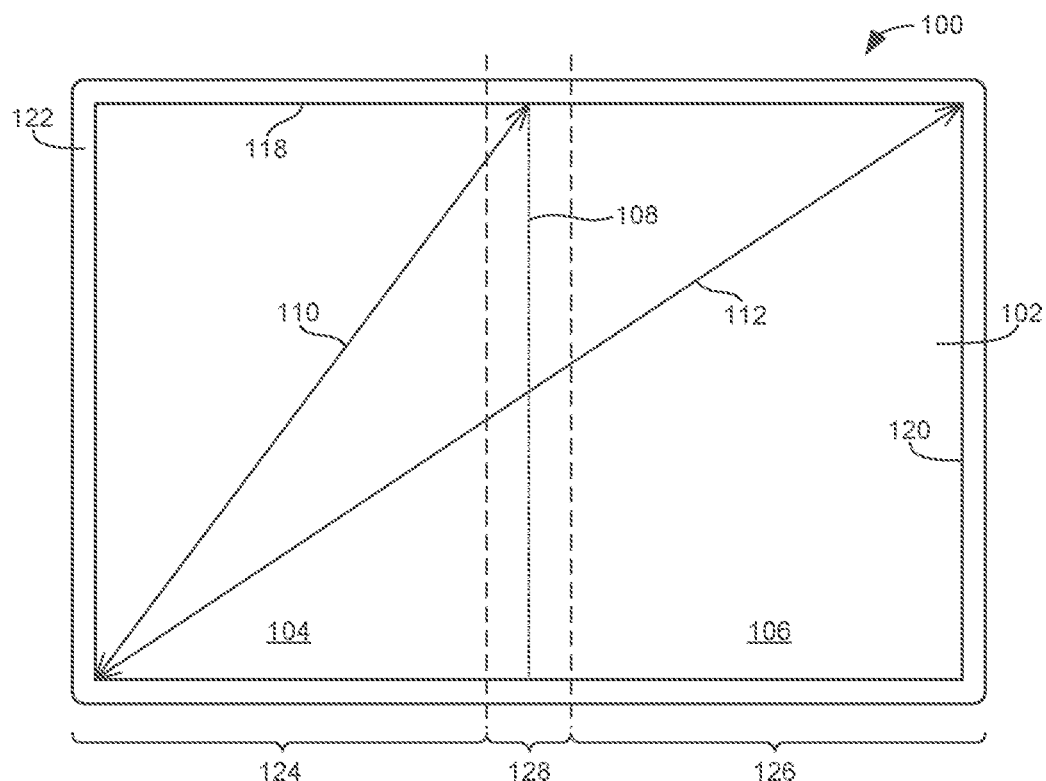
FIGS. 1-4 show an example computing device with a foldable display constructed in accordance with teachings disclosed herein.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and/or in fixed relation to each other. Stating that any part is in "contact" with another part indicates that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, such descriptors are used merely for ease of referencing multiple elements or components.

DETAILED DESCRIPTION

FIGS. 1-4 show an example computing device 100 with a foldable or bendable display 102 constructed in accordance with teachings disclosed herein. As used herein, the terms "foldable" and "bendable" used with reference to a display are interchangeable and indicate that different portions of the display are capable of being repeatedly adjusted relative to one another as the display is bent, folded, or curved about at least one axis without damage to the display. In other words, a "foldable" or "bendable" display includes a portion that has a variable radius of curvature that can be manipulated. The particular radius of curvature of the fold or bend may be of any suitable dimension (e.g., 5 inches, 1 inch, 0.1 inches, 0.01 inches, etc.). In some examples, the display 102 may be folded inward such that the radius of curvature defines a concave surface. In other examples, the display 102 may be folded outward such that the radius of curvature defines a convex surface. In other examples, the display 102 may be folded both inwards and outwards. As used herein, "display," "screen," and "display screen" have the same meaning and refer to a structure to visibly convey an image, text, and/or other visual content to a human in response to an electrical control signal.

Figure 2:
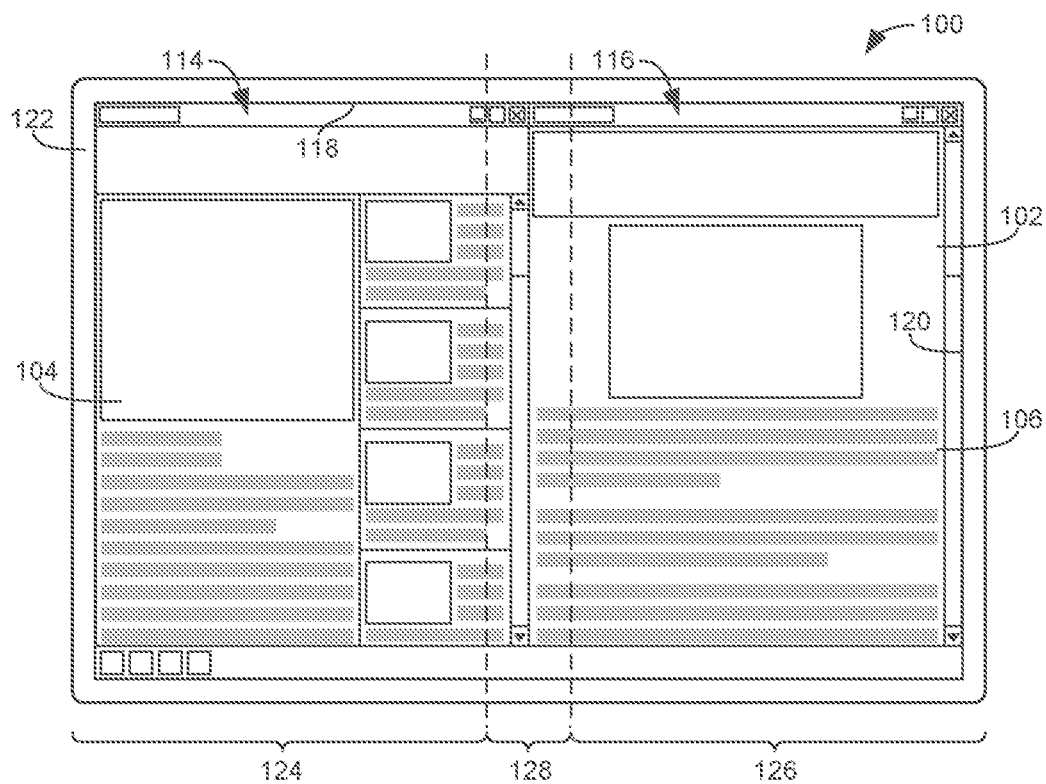
Figure 3:
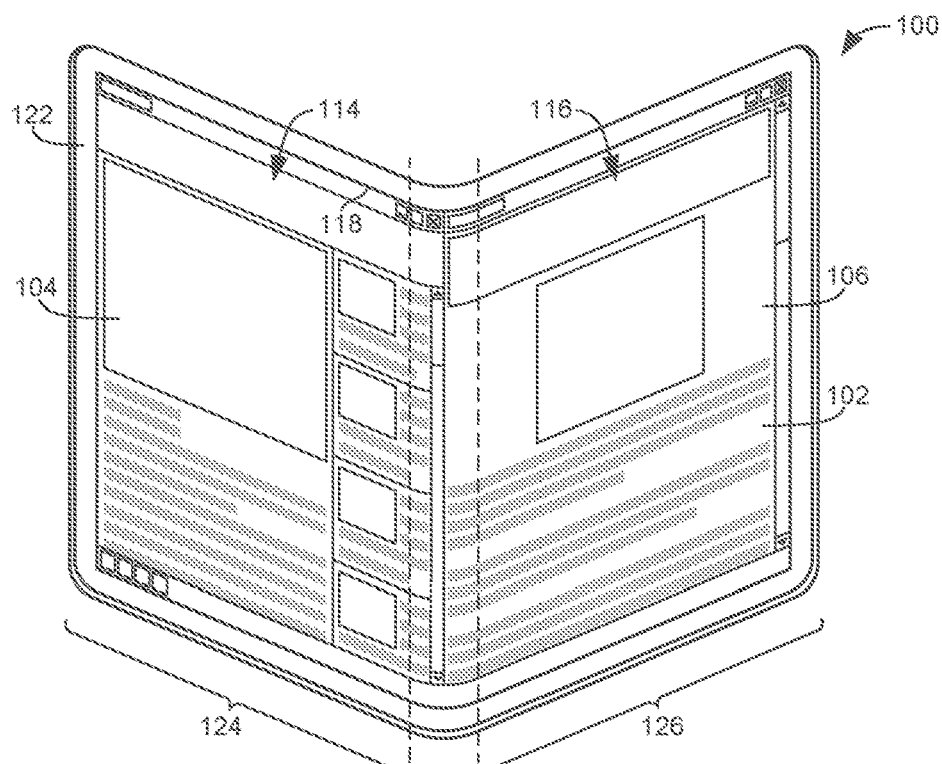
Figure 4:
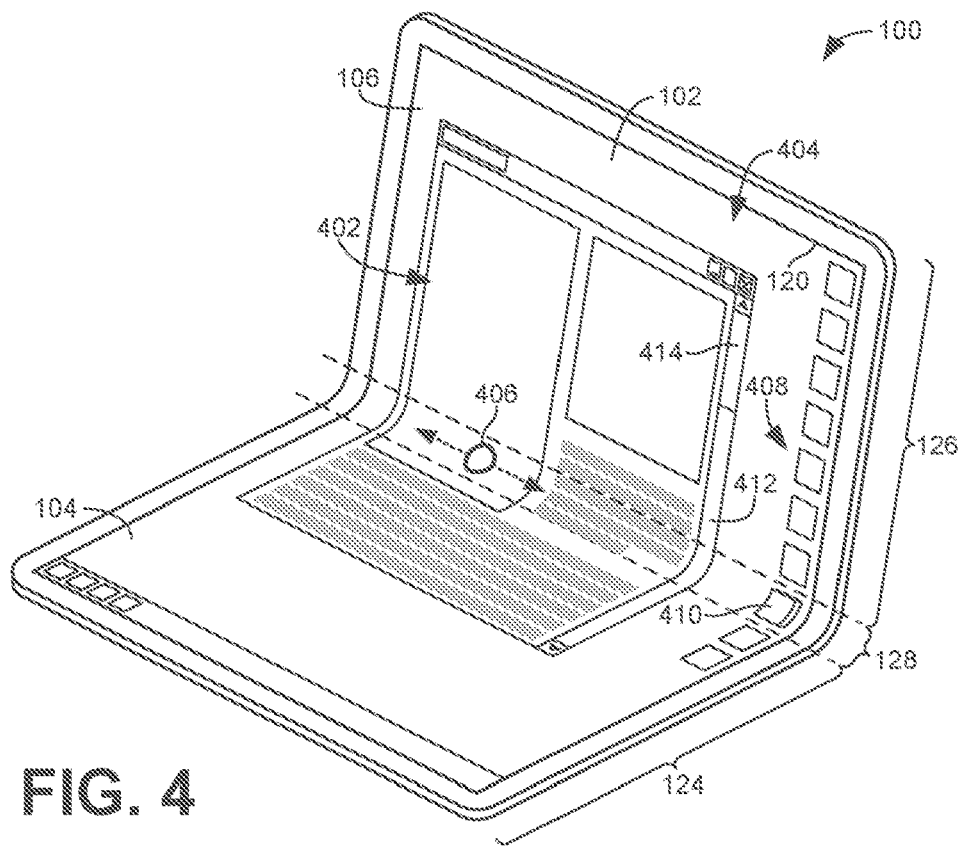

The example computing device 100 shown in FIGS. 1 and 2 is in an unfolded or opened configuration with the display in an unfolded state. The device 100 shown in FIGS. 3 and 4 is in a folded configuration with the display in an example folded state. As used herein, the terms "unfolded configuration" and "opened configuration" indicates the display 102 is in an unfolded state in which a foldable region of the display is opened with the radius of curvature at the folding location being at a maximum. In some examples, the unfolded state of the display 102 corresponds to when the display 102 is in a flat state when an entirety of the user facing surface of the display 102 lies in a common plane. However, some example devices may not have a flat state (e.g., devices with curved displays that may nevertheless be folded to differing non-planar positions). The display 102 of such a device is in an unfolded state when the display 102 is fully opened (though potentially with a curved display) with the radius of curvature of any bendable portion at a maximum. By contrast, the term "folded configuration" indicates the display 102 is in the folded state in which the radius of curvature within a foldable region of the display 102 is less than its maximum possible radius of curvature. In examples where the display 102 is flat in the unfolded configuration, the display 102 is in a folded state when at least two different portions of the user facing surface of the display 102 are non-coplanar relative to one another.

As shown in the illustrated example of FIG. 1, the display 102 includes two similarly sized display areas 104, 106 corresponding to separate halves of the display 102 divided by a central fold line 108 along which the display 102 may be folded (e.g., a line define a location where the radius of curvature of the display 102 may be adjusted). The two separate display areas 104, 106 (and, thus, the full display 102) may be any suitable size and have any suitable dimensions. In some examples, the dimensions of the display areas 104, 106 and/or the full display 102 are dimensioned to have a standard aspect ratio. For example, each display area 104, 106 may have a 4:3 aspect ratio, which results in a 3:2 aspect ratio for the full display 102. As a specific example, a diagonal dimension 110 for each of the two display areas 104, 106 may be approximately 12 inches and a diagonal dimension 112 of the full display 102 when in the unfolded configuration is approximately 17.3 inches.

In the illustrated example, each half of the display 102 (e.g., the display areas 104, 106) have a standard aspect ratio to facilitate the display of user interfaces designed specifically for such aspect ratios. Thus, as shown in the illustrated example, of FIG. 2, a first user interface 114 is rendered in the first display area 104 and a second user interface 116 is rendered in the second display area 106. In other examples, a single user interface may fill the entire display 102 according to the aspect ratio of the full screen. In other examples, a user interface may be rendered within a portion of one of the display areas 104, 106 and/or extend across the fold line 108 to cover at least a portion of each display area 104, 106. Further, the user interfaces rendered via the display may be provided in different orientations. For instance, in the illustrated example of FIGS. 2 and 3, the user interfaces 114, 116 are side-by-side with a long edge 118 of the display 102 running parallel with the top of the user interfaces 114, 116. In other examples, the user interfaces 114, 116 may be rotated by 90 degrees with one interface above the other such that a short edge 120 of the display 102 runs parallel with the top of the user interfaces. In some examples, as described more fully below in connection with FIG. 8, the content rendered via the first display area 104 (e.g., the first user interface 114) is controlled independent of the content rendered via the second display area 106 (e.g., the second user interface 116). Although the content rendered via each display area 104, 106 may be controlled independently, in some examples, the content on both display areas 104, 106 is synched to enable the rendering of content that seamlessly extends across both display areas 104, 106.

In the illustrated example of FIGS. 1-4, the computing device 100 includes a housing 122 that includes a first rigid portion 124 associated with the first display area 104 of the display 102 and a second rigid portion 126 associated with the second display area 106 of the display 102. In this example, the rigid portions 124, 126 are separated by a bendable portion 128 along which the fold line 108 extends. In the illustrated example, the bendable portion 128 includes part of the first display area 104 and part of the second display area 106 such that content may be displayed on some or all of the bendable portion 128.

In this example, the display 102 is affixed to and/or otherwise supported by the rigid portions 124, 126 of the device 100. As a result, in some examples, the display 102 cannot be folded within the rigid portions 124, 126 of the device 100 because these portions of the housing 122 are rigid and, thus, cannot be folded. That is, in some examples, the material of the display 102 may be bendable but it is prevented from being bent because it is affixed to the rigid (non-bendable) portions 124, 126 of the housing 122. By contrast, in this example, the display 102 is bendable or foldable within the bendable portion 128 based on the bendable nature of the associated portion of the housing 122. In some examples, the bendable portion 128 of the computing device 100 includes hinges and/or bendable materials to enable the folding and/or bending of the display 102 within the bendable portion 128 of the device.

In some examples, the width of the bendable portion 128 is significantly smaller than represented in the illustrated example. In other examples, the width of the bendable portion 128 is larger than shown. In some examples, the entire display 102 is bendable such that there are no rigid portions 124, 126 associated with the display. In some examples, the outer edges of the bendable portion 128 correspond to the limits of the portion of the display 102 (and associated housing 122) that is capable of bending. In other examples, the bendable portion 128 may extend beyond the limits of the bendable portion of the display 102 to include portions of the display that cannot be folded (e.g., due to being affixed to rigid sections of the housing 122).

The computing device 100 of the illustrated example may be moved from an unfolded configuration as shown in FIGS. 1 and 2 to one or more different folded configurations as shown in FIGS. 3 and 4. In some examples, the folded configurations may include any suitable angle between the rigid portions 124, 126 of the display 102. For instance, in some examples, the bendable portion 128 may be sufficiently bendable to fold the first rigid portion 124 of the device 100 onto the second rigid portion 126 of the device 100 such that the first and second display areas 104, 106 of the display 102 face one another with their outer edges aligned. Additionally or alternatively, in some examples, the display 102 and housing 122 may bend backwards such that the rigid first and second display areas 104, 106 face outwards and away from each other.

In addition to bending the computing device 100 into different folded configurations, in some examples, the orientation of user interfaces rendered on the display 102 may differ depending on the orientation of the device 100 and its corresponding folded configuration. For example, FIG. 3 illustrates the computing device 100 folded and oriented in a book configuration with the same user interfaces 114, 116 shown in FIG. 2 rendered side-by-side with a top of the user interfaces extending parallel to the long edge 118 of the display 102. By contrast, FIG. 4 illustrates the computing device 100 folded and oriented in a laptop configuration with a third user interface 402 extending across both display areas 104, 106 with the top being parallel with the short edge 120 of the display 102. In this example, the third user interface 402 is an application user interface associated with an application executed on the device 100. Further, as shown in the illustrated example, the application user interface 402 is contained within a window inside of an operating system user interface 404 rendered to fill the rest of the display 102.

In some examples, the bendable portion 128 of the computing device 100 may be positioned at different locations and/or oriented in a different direction than what is shown in the illustrated examples of FIGS. 1-4. For instance, in some examples, the bendable portion 128 may not be centered on the display 102 such that the fold line 108 does not divide the screen in half. In some examples the bendable portion 128 may extend lengthwise across the device 100 in a direction that is rotated 90 degrees relative to the crosswise orientation shown in FIG. 1. In other examples, the bendable portion 128 may extend at a different angle relative to the device 100. Further, in some examples, the location of the fold line 108 may be at different locations within the bendable portion 128 (e.g., other than at the very center). In some examples, the position of the fold line 108 relative to the boundaries of bendable portion 128 may be adjusted or selected by a user. This is possible when the radius of curvature of a fold in the display 102 is less than the width of the bendable portion 128. Furthermore, in some examples, there may be more than one bendable portion 128 and/or more than one fold line 108 to enable the display 102 to bend in multiple directions and/or at multiple locations. In some such examples, ones of the multiple different fold lines 108 correspond to a portion of the display 102 that bends or folds inward and other ones of the multiple fold lines 108 correspond to a portion of the display 102 that bends or folds outward. In other examples, the multiple different fold lines 108 may correspond to portions of the display 102 that bend in the same direction (both inward, both outward, or each capable of bending both inward and outward).

Figure 5:
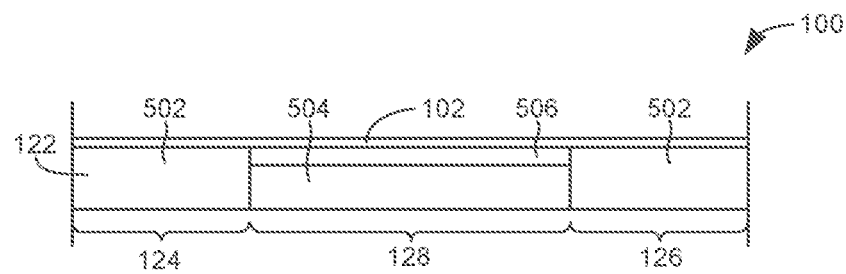
FIGS. 5-7 are cross-sectional views of the bendable portion of the example computing device of FIGS. 1-4 in different configurations.
Figure 6:
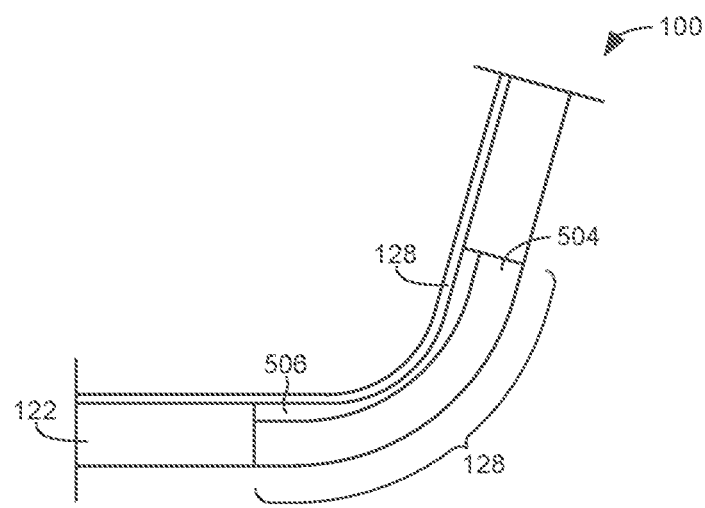

The example display 102 of FIGS. 1-4 is a touchscreen. Providing touch sensitive functionality on a bendable display presents a number of challenges. For instance, to enable the display 102 to freely bend, the display may need to be detached from the underlying structure of the housing 122. As a result, the touchscreen 102 within the bendable portion 128 of the computing device 100 may be unsupported in that region as shown in the cross-sectional views of the device 100 shown in FIGS. 5 and 6. In particular, FIG. 5 shows the device in an unfolded configuration while FIG. 6 shows the device 100 folded into a folded configuration. As shown in the illustrated examples, the display 102 is supported by and/or affixed to an underlying rigid structure 502 associated with the housing 122 in the rigid portions 124, 126 of the device 100. By contrast, in the illustrated example, the display 102 is separated from an underlying bendable structure 504 within the bendable portion 128 of the device 100. The bendable portion 128 of the illustrated example is shown as corresponding to the width of the underlying bendable structure 504. While this corresponds to the portion of the device 100 that is capable of bending, as mentioned above, in some examples, the bendable portion 128 may be defined to include additional portions of the display 102 that cannot bend (e.g., associated with portions of the underlying rigid structure 502).

In the illustrated example, the separation of the display 102 and the underlying bendable structure 504 within the bendable portion 128 results in a gap 506 beneath the display 102 that may be up to 30 mm wide or more depending on the bend radius of the fold in the display. As a result, when an end user touches the touchscreen 102 in the bendable portion 128, there is the risk of the user pressing too hard on the unsupported screen, thereby causing damage to the screen. Additionally or alternatively, in some examples, a user pressing on the touchscreen 102 within the bendable portion 128 of the device 100 may press against and potentially damage the hinge mechanism built into the underlying bendable structure 504. In some examples, the hinge mechanism built into the underlying bendable structure 504 may ensure the gap 506 is negligible and/or non-existent. However, the hinge mechanism may still not provide the same amount of support as is possible in the rigid portions 124, 126 of the device 100. In some examples, the hinge mechanism built into the underlying bendable structure 504 may provide adequate support to the display 102 (e.g., reduce the gap 506 to a negligible or non-existent state) when the device 100 is in the unfolded configuration but not provide adequate support when the device 100 is in a folded configuration. In all of these scenarios, the lack of adequate support to the display 102 and/or the separation of the display 102 from the underlying bendable structure 504 presents an increased risk of damage to the components as a user touches the display 102 (as a touchscreen) to interact with content rendered on the display. Accordingly, there is a need to enable users to interact with content within the bendable portion of the touchscreen 102 while protecting the touchscreen 102 from damage and/or reducing the frequency and/or pressure with which the touchscreen 102 is touched by users, thereby reducing the risk of damage to the display.

Figure 7:
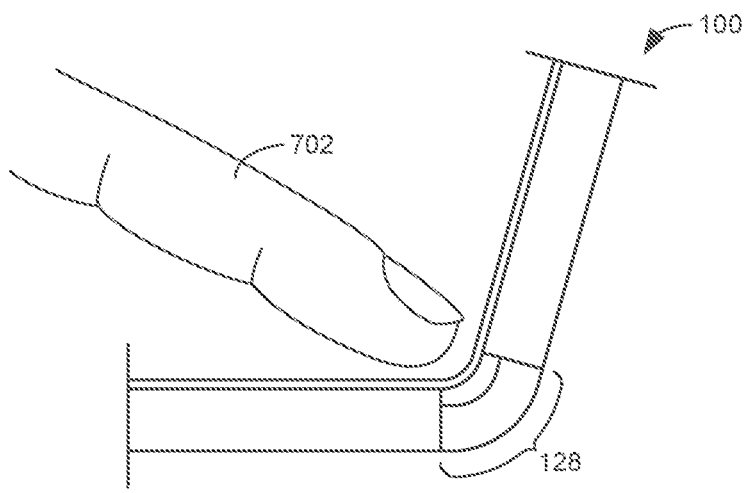

Another challenge with foldable touchscreens arises in situations where the radius of curvature of a particular fold is relatively small. FIG. 7 illustrates the example computing device 100 with a fold in the display having a much smaller radius of curvature than in FIG. 6. If the radius of curvature is less than the size of an object used to touch the display (e.g., a user's finger 702 as shown in FIG. 7), the user may not be able to precisely touch a certain point on the display 102 that is within the bendable portion 128. In some examples, the user may not be able to touch the desired point within the bendable portion 128 at all because the object (e.g., finger 702) is obstructed by contact with the flat portions of the display on either side of the fold. Such a situation sometimes also results in two points of contact on the touchscreen (one on either side of the fold), thereby creating ambiguity in where the user is intending to touch the display.

Examples disclosed herein overcome the above and other challenges by providing hover sensing capabilities within the bendable portion 128 of the touchscreen 102. As used herein, a touchscreen that is capable of "hover sensing" is able to detect the presence of an object (e.g., a user's finger, a stylus, etc.) that is within a threshold distance (e.g., as much as 2 inches) of the display without the object touching the display (e.g., spaced apart from but hovering in proximity to the display). The more sensitive the hover sensing system, the greater the threshold distance at which objects may be detected. While a hover sensing system is capable of detecting hovering objects such hover sensing systems may also detect objects that are in physical contact with or negligibly spaced apart from (e.g., less than 0.1 inches away from) the display. Sensing systems for touchscreens that are limited to detecting objects in actual contact with the touchscreen are referred to herein as touch sensing systems. Both hover sensing systems and touch/contact system are capable of detecting the location of the object relative to the display.

Enabling hover sensing within the region of the touchscreen 102 associated with the bendable portion 128, as in the illustrated example, enables a user to interact with the display without having to touch the display, thereby reducing the risk that the display, the hinge mechanism, and/or other components within the bendable portion 128 will be damaged from contact. Further, hover sensing in the illustrated example enables a user to effectively reach and/or interact with content within the bendable region even when the user is unable to precisely touch the content because of a relatively small radius of curvature for the fold.

While some examples provide the entire display 102 with hover sensing capabilities, such examples add costs to manufacturing the device 100 and also increase processing and power requirements for the operation of the device 100. Accordingly, in some examples, the display 102 includes a hybrid hover and touch sensing system in which the regions of the touchscreen 102 outside of the bendable portion 128 (e.g., in the rigid portions 124, 126) does not include hover sensing capabilities. Rather, such regions of the touchscreen 102 include typical touch sensing capability (e.g., require actual contact with the display and/or require objects to be within a negligible distance (e.g., 0.1 inches or less) of the display). In some examples, the hover sensing system is incorporated into and/or integrated with the touch sensing system associated with the touchscreen 102. In other examples, the hover sensing system may be implemented separately from and/or independently of the touch sensing system of the touchscreen 102. More particularly, the touch sensitive functionality of the touchscreen 102 may be implemented using any suitable technology including resistive, capacitive (e.g., surface capacitive or projected capacitive), acoustic, and/or infrared based sensing technologies. While all of these technologies may be suitable to implement a touch sensing system, only some of them are also presently capable of hover sensing (e.g., detecting objects beyond a negligible distance as noted above). For instance, resistive touch sensing requires the application of pressure (e.g., via the force of a physical touch) on the touchscreen such that resistive touching techniques cannot detect an object hovering a short distance away from the display. By contrast, capacitive touch sensing is accomplished by detecting changes in capacitance between two electrodes caused by a conductive or dielectric material coming into close proximity with the electrodes. Where the electrodes and/or the associated sensors are sufficiently sensitive, the object may be detected without direct contact with the touchscreen because the object will affect the electric field produced between the electrodes. As such, a capacitive sensor system that is constructed with relatively high sensitivity may be used for hover sensing.

Regardless of the particular technology implemented, touch and hover sensing is often implemented with a two dimensional grid or array of electrodes positioned across the region(s) of the display where touch sensing and/or hover sensing is to be enabled. More particularly, as shown in the illustrated example of FIG. 8, the touchscreen 102 includes multiple columns of transmitters 802, 804 that extend perpendicularly to multiple rows of receivers 806. In the illustrated example of FIG. 8, only a few of the transmitters 802, 804 and the receivers 806 are shown for the sake of clarity. Further, the transmitters 802, 804 and the receivers 806 are significantly enlarged in FIG. 8 for purposes of explanation. In the illustrated example, the transmitters 802 within the bendable portion 128 of the device 100 are represented with different shading than the transmitters 804 within the rigid portions 124, 126 of the device 100 to indicate the different purpose, design, construction, and/or operation of the transmitters in the different regions. More particularly, in some examples, the transmitters 802 within the bendable portion 128 of the device 100 are constructed to be relatively sensitive so as to enable hover sensing. Thus, the transmitters 802 within the bendable portion 128 may be referred to herein as hover sensing transmitters and form part of a hover sensing system 808 of the display 102. By contrast, the transmitters 804 within the rigid portions 124, 126 are constructed to provide touch sensing capabilities without hover sensing. Thus, the transmitters 804 within the bendable portion 128 may be referred to herein as touch sensing transmitters and form part of a touch sensing system 810 of the display 102. As mentioned above, in some examples, touch sensing transmitters 804 may be included within the bendable portion 128 independent of the hover sensing transmitters 802. In other examples, the hover sensing transmitters 802 may serve as touch sensing transmitters for the touch sensing system 810 within the bendable portion 128.

Figure 8:
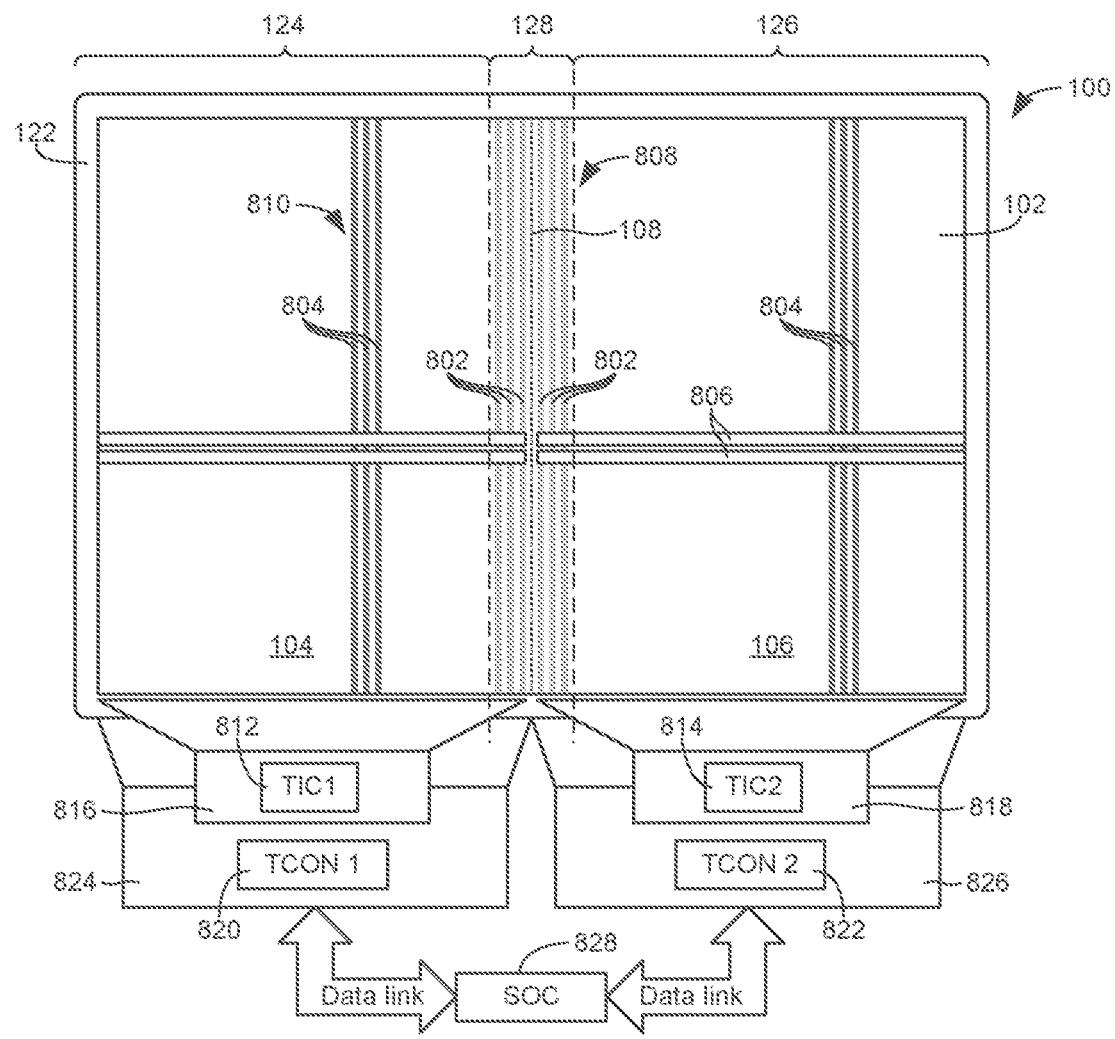
FIG. 8 is a schematic illustration of example control chips used to control the display of the example computing device of FIGS. 1-7.

As shown in the illustrated example of FIG. 8, the receivers 806 associated with the first display area 104 of the touchscreen 102 are separate from the receivers 806 associated with the second display area 106 of the touchscreen 102 due to a small break or interruption at the central fold line 108. In other words, individual ones of the receivers 806 do not extend the full way across the display but only across either the first display area 104 or the second display area 106. Dividing the receivers 806 between the first display area 104 and the second display area 106 enables each area to be scanned independently for touch events and/or hover events, thereby reducing the processing time to detect such events. In other examples, the receivers 806 may extend across the entire touchscreen 102 without interruption to implement a single scan of the entire display 102 for touch events and/or hover events. As used herein, a "touch event" refers to the touch sensing system (and/or the hover sensing system) detecting an object (e.g., a user's finger, a stylus, etc.) touching a particular point on the touchscreen 102. As used herein, a "hover event" refers to the hover sensing system (e.g., associated with the bendable portion 128) detecting an object (e.g., a user's finger, a stylus, etc.) in close proximity to (e.g., within the threshold distance discussed above though not necessarily touching) a particular point on the touchscreen 102.

In some examples, the independent processing of the touch and/or hover sensing systems associated with the first and second display areas 104, 106 is accomplished based on the implementation of separate first and second touchscreen controller chips or touch ICs 812, 814 on corresponding first and second touch flexible printed circuits (FPCs) 816, 818. Further, in some examples, the rendering of content on each of the first and second display areas 104, 106 is controlled independent of each other based on separate first and second display drivers 820, 822 (e.g., separate timing controllers (T-cons)) disposed on corresponding first and second display FPCs 824, 826. Thus, in some examples, both the control and detection of user interactions with the two display areas 104, 106 as well as the control of content rendered via the display areas 104, 106 are handled independent of one another. In this example, with reference to FIG. 2, the first display driver 820 controls the display of the first user interface 114 in the first display area 104 and the second display driver 820 controls the display of the second user interface 116 in the second display area 106. In some examples, both the first and second display drivers are in communication with a system-on-chip 828 and/or other host processor for the computing device 100. Independently controlling the touch and sensing systems in each display area 104, 106 and independently controlling the display of content in each display area in this manner can increase processor efficiency.

Although two touch ICs 812, 814 and two display drivers 820, 822 are shown in the illustrated example of FIG. 8, in other examples, more or fewer touch ICs and/or display drivers may be implemented. For instance, in some examples, a single touch IC may control the hover and touching sensing for the entire touchscreen 102. Further, in some examples, a single display driver may control the display of content rendered across the entire area of the touchscreen 102.

In some examples, the content rendered for display on the touchscreen 102 is adapted within the bendable portion 128 to facilitate a user to interact with the content using the hover sensing system described above and to reduce the likelihood of the user touching the display in that region in a manner that may damage the device 100. In particular, in some examples, a visual notification is generated on the touchscreen 102 when a hover event has been detected to inform the user that their finger, stylus, or other object used to interact with the display has been detected. In this manner, a user can determine that they do not need to move any closer to the display and risk causing damage. In some examples, the visual notification is a static visual indicator that is provided independent of the location where the hover event is detected. In other examples, as shown in FIG. 4, the visual notification includes a visual marker 406 (e.g., a circle, a halo, an "x", a crosshair, a dot, a magnifying bubble, etc.) rendered at the location where the hover event is detected. In some such examples, the marker may move (as indicated by the arrows) within the bendable portion 128 based on movement of the object detected in connection with the hover event. In this manner, a user not only is informed that they are sufficiently close to the display to interact with the rendered content, but the user is also informed of the particular location on the display with which the hover sensing system is associating the detected hover event. In some examples, the visual marker 406 may be application specific. That is, in some examples, the visual marker 406 is generated in connection with the particular application for which the application user interface 402 on the display 102 in FIG. 4 is generated. In other examples, the visual marker 406 may be generated by the underlying operating system to be displayed regardless of the user interface associated with a particular application executing on the device 100.

In some examples, other types of notifications may be generated to inform a user that a hover event has been detected. For example, the device 100 may vibrate and/or provide different haptic feedback in response to the detection of hover event. Additionally or alternatively, an audible notification may be generated in response to a hover event.

Additionally or alternatively, in some examples, the appearance of content rendered on the display 102 within the bendable portion 128 may differ from content in the rigid portions 124, 126 regardless of whether a hover even has been detected. For instance, the operating system user interface 404 of FIG. 4 includes a series of icons 408 that extend across the bendable portion 128. As shown in the illustrated example, the icon 410 within the bendable portion 128 is rendered to appear more three-dimensional (3D) than the other icons 408 to convey the idea that a user does not need to actually touch the surface of the display 102 to select the particular icon 410. In other examples, the icon 410 within the bendable portion 128 may differ in appearance in a manner other than a 3D-like effect. Furthermore, such changes in appearance are not limited to icons but may apply to any type and/or portion of content rendered on the display 102.

In some examples, particular user interactions with the display may begin in one of the rigid portions 124, 126 of the display 102 and cross into the bendable portion 128 or vice versa. As an example, the third user interface 402 shown in FIG. 4 includes a scrollbar 412 that extends between the first and second display areas 104, 106 across the bendable portion 128. A user may seek to select the scrollbar slider 414 and drag it all the way down to the bottom of the scrollbar 412. To initially select the slider 414, the user may touch the display 102 (with a finger or stylus) at the location of the slider 414 and continue touching the display while dragging the slider 414 down the scrollbar. Dragging the slider 414 all the way to the bottom of the scrollbar 412 using only a touch sensing system, would require the user to continuously touch the display through the bendable portion 128. This may result in damage to the display as described above because the display may be less supported within the bendable portion 128. Furthermore, in some examples, particularly, where the bend radius is relatively small, the user may not be able to maintain a continuous point of contact with the touchscreen 102. These problems are overcome by invoking the hover sensing system 808 within the bendable portion 128. Even if the user uses a light touch or even momentarily ceases to touch the display 102 as the bendable portion 128 is traversed, the system will interpret the user interaction as one continuous motion to control the slider 414 through the bendable portion of the display 102.

In some examples, to facilitate the transition from the touch sensing system 810 within the rigid portions 124, 126 and the hover sensing system 808 in the bendable portion 128, the hover sensing system 808 is given priority over the touch sensing system 810. That is, when a hover event has been detected, user interactions with the touchscreen 102 may be governed by rules associated with hover-based inputs that do not require continuous contact with the display for a single user input and/or interaction. On the other hand, if no hover event is detected, the user interactions with the touchscreen 102 may be governed by rules associated with touch-based inputs in which each touch and release is interpreted as an independent user input and/or interaction.

Figure 9:
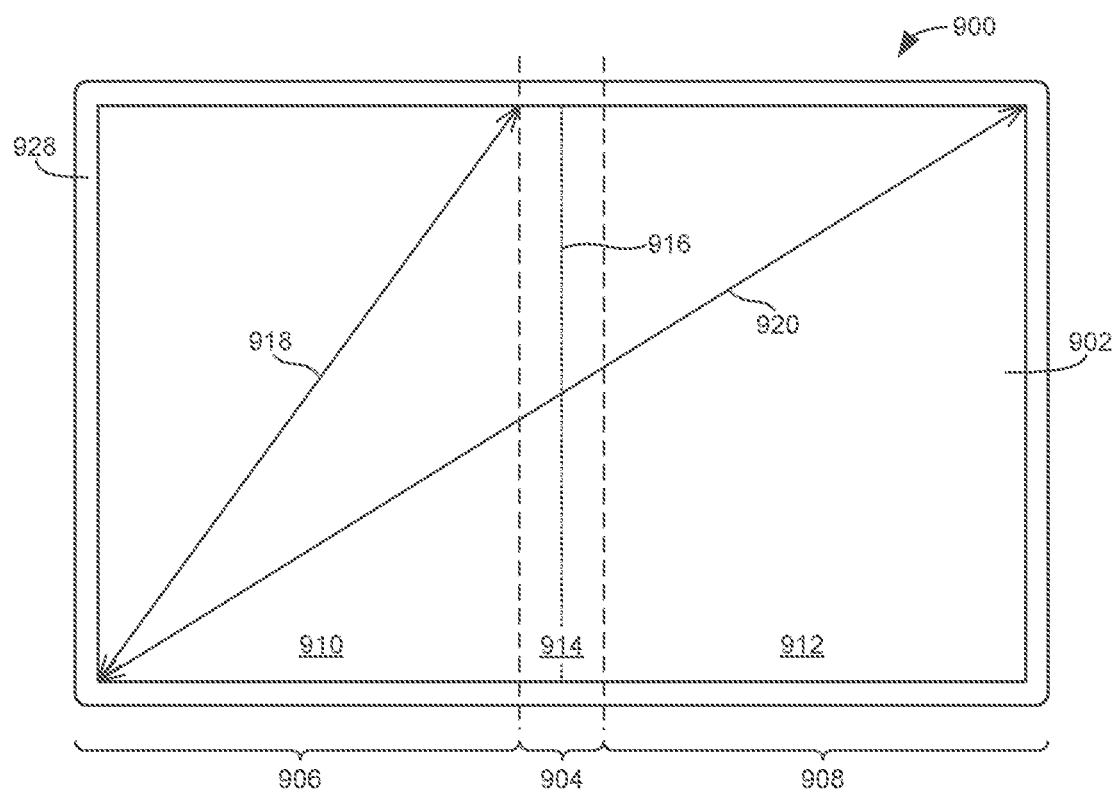
FIGS. 9-10 illustrate another example computing device with a foldable display constructed in accordance with teachings disclosed herein.
Figure 10:
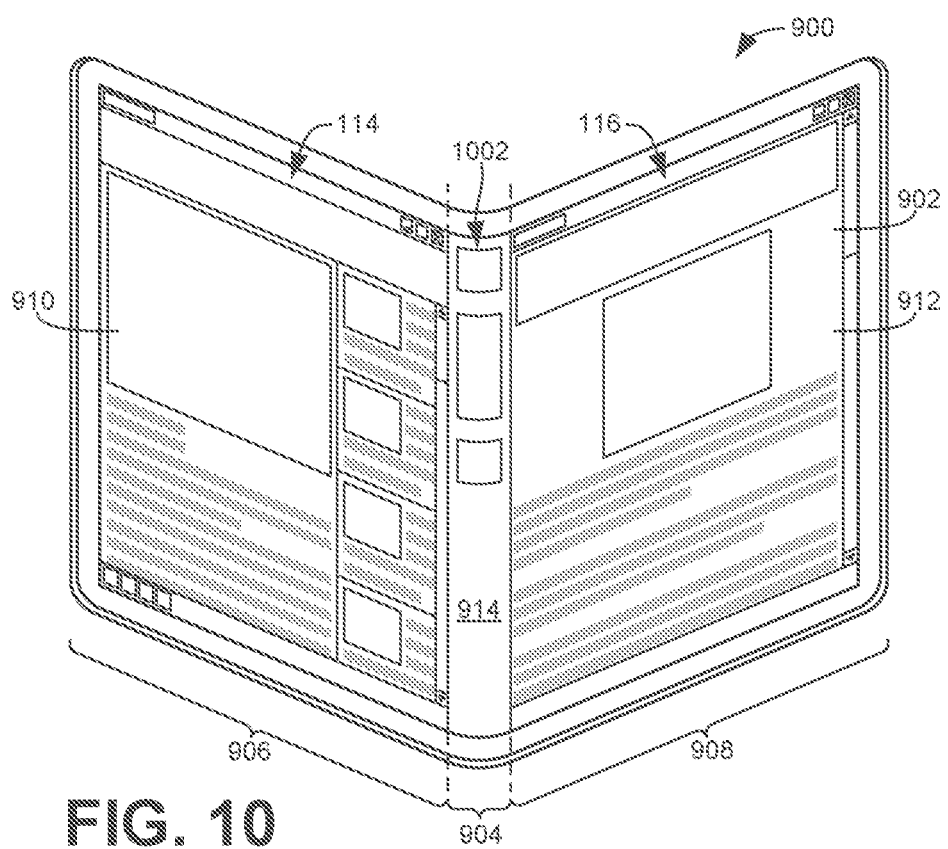

FIGS. 9-10 illustrate another example foldable display computing device 900 with a foldable display 902 constructed in accordance with teachings disclosed herein. More particularly, FIG. 9 shows the device 900 in an unfolded configuration and FIG. 10 shows the device 900 folded into a folded configuration with a bendable portion 904 separating first and second rigid portions 906, 908. The display 902 includes a first display area 910 associated with the first rigid portion 906, a second display area 912 associated with a second rigid portion 908, and a third display area 914 associated with the bendable portion 904. In some examples, similar to the display 102 of FIGS. 1-8, the first and second display areas 910, 912 of FIG. 9 have a standard aspect ratio (e.g., a 4:3 aspect ratio). However, unlike the display 102 of FIGS. 108, the first and second display areas 910, 912 of FIG. 9 do not extend into the bendable portion 904 or up to a central fold line 916. Rather, the first and second display areas 910, 912 extend up to the edge of the bendable portion 904. As a result, while both the first and second display areas may have standard 4:3 aspects ratios, the aspect ratio of the entire display will not be exactly 3:2 (as in the case of the display 102 of FIG. 1) because there will be extra width arising from the width of the bendable portion 904. As a specific example, if the diagonal dimension 918 of the first and second areas is 12 inches, the diagonal dimension 920 of the full display 902 will be 17.3+X inches, where X depends on the width of the third display area 914.

FIG. 10 shows the same first and second user interfaces 114, 116 shown in FIG. 2, rendered in the respective first and second display areas 910, 912 of the display 902. As shown in the illustrated example, unlike in FIG. 2, the user interfaces 114, 116 in FIG. 10 do not extend into the bendable portion 904. As a result, a user will not need to interact with the bendable portion 904 of the display 902 when seeking to interact with either of the user interfaces 114, 116. Accordingly, in some such examples, there is no need for a hover sensing system as described above in connection with the example computing device 100 of FIGS. 1-8. Further, in some examples the touch sensing system within the bendable portion 904 may be disabled or deactivated. In some examples, the bendable portion 904 may not include a touch sensing system. As users become aware that the ability to detect touch events in the bendable portion 904 is either disabled or omitted, the users will be less likely to attempt to touch the display 102 in the bendable portion 904, thereby reducing the likelihood of damage to the device 100 in that region. While the display 102 may not be able to detect touch events within the bendable portion 904, the display may nevertheless render content within the bendable portion. Accordingly, the third user interface 1002 is shown within the bendable portion 904 in the illustrated example of FIG. 10. In some such examples, the third user interface 1002 includes non-interactive information that a user would not seek to touch (e.g., date, time, logos, etc.). Further, in some examples, the third user interface 1002 may include an indication or notification that touch sensing capabilities are deactivated or unavailable in the bendable portion 904.

Figure 11:
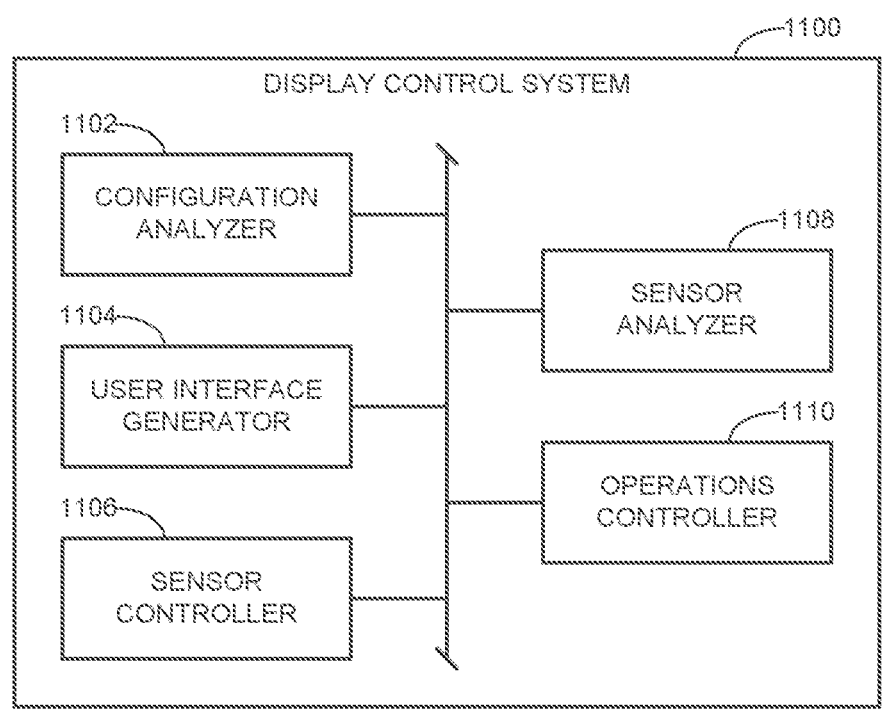
FIG. 11 is a block diagram illustrating an implementation of an example display control system for the example computing devices of FIGS. 1-10.

FIG. 11 is a block diagram illustrating an implementation of an example display control system for the computing devices 100, 900 of FIGS. 1-10. However, for purposes of explanation, the following description is provided with respect to the computing device 100 of FIGS. 1-8. The display control system 1100 includes an example configuration analyzer 1102, an example user interface generator 1104, an example sensor controller 1106, an example sensor analyzer 1108, and an example operations controller 1110.

In the illustrated example of FIG. 11, the example configuration analyzer 1102 determines the physical configuration of the example computing device 100. That is, in some examples, the configuration analyzer 1102 determines when the device 100 is in an unfolded configuration (as shown in FIGS. 1, 2, 5, and 8) and when the device 100 is in a folded configuration (as shown in FIGS. 3, 4, 6, and 7). In some examples, this determination is made based on feedback from one or more sensors associated with a hinge mechanism in the bendable portion 128 of the device. Additionally or alternatively, in some examples, the configuration analyzer 1102 distinguishes between different types of folded configurations such as the book configuration (as shown in FIG. 3) and the laptop configuration (as shown in FIG. 4). In some examples, the particular type of folded configuration is determined based on feedback from an orientation sensor. In some examples, the configuration analyzer 1102 may also determine the orientation of the device 100 when in the unfolded configuration.

In the illustrated example of FIG. 11, the example user interface generator 1104 generates user interface(s) to be displayed on the display 102. In some examples, the user interface(s) are generated based on the configuration information and/or the orientation information provided by the configuration analyzer 1102. In some examples, different user interfaces(s) and/or particular elements of the user interface(s) may differ depending on whether the device 100 is in the unfolded configuration or a non-fat configuration. More particularly, in some examples, the user interface generator 1104 may provide a touch-based user interface for display when the device is in the unfolded configuration. In some examples, the touch-based user interface is a standard user interface that includes touch sensitive interactive content that may be positioned anywhere across the display 102. Further, in some examples, the user interface generator 1104 adjusts and/or modifies the touch-based user interface within a region corresponding to the bendable portion 128 of the device 100 when the device 100 is in the folded configuration. Specifically, in some examples, the user interface generator 1104 modifies the touch sensitive interactive content to have a different appearance (e.g., one that produces a 3D effect) indicative of being hover sensitive interactive content. In this manner, users are able to understand that they may hover over the interactive content without touching the display 102 to interact with the content. In some examples, rather than modifying a touch-based user interface associated with the unfolded configuration, the user interface generator 1104 may replace the entire touch-based user interface with a hover-based user interface that includes an indication of hover sensitive interactive content within the bendable portion 128. In some examples, there may be more than one user interface generator 1104 to generate user interfaces for different portions of the display 102 (e.g., a first user interface generator to generate user interfaces for the first display area 104 and a second user interface generator to generate user interfaces for the second display area 106). In some examples, the user interface generator 1104 includes, corresponds to, and/or operates in conjunction with the display drivers 820, 822 of FIG. 8

In the illustrated example, the sensor controller 1106 controls the operation of the touch sensing system and/or the hover sensing system associated with the display 102. As mentioned above, in some examples, the touch sensing system may include the hover sensing system. In other examples, the hover sensing system may be independent of the touch sensing system. In some such examples, the display control system 1100 may include more than one sensor controller 1106. Additionally or alternatively, in some examples, multiple sensor controllers 1106 may be implemented to control touch sensing systems and/or hover sensing systems in different areas of the display 102. In some examples, the sensor controller 1106 includes, corresponds to, and/or operates in conjunction with the touch ICs 812, 814 of FIG. 8.

In the illustrated example, the sensor analyzer 1108 analyzes feedback from the sensing systems controlled by the sensor controller 1106 to determine when a hover event and/or a touch event has occurred. Furthermore, the example sensor analyzer 1108 determines the location of the detected hover event and/or the touch event on the display 102. In some examples, the sensor analyzer 1108 determines an effect of the detected hover event and/or touch event based on an analysis of the content on the user interface at the location of the hover event and/or touch event. AS described above, in some examples, the way a touch event and/or hover event are interpreted by the sensor analyzer 1108 depends on whether a hover event has been detected. When a hover event has been detected, hover-based user interactions are assumed such that a touch and release and subsequent touch is not necessarily interpreted as two separate interactions but may be treated as a single user interaction. In some examples, the sensor analyzer determines whether multiple touches and releases are associated with a single user interaction or multiple interactions associated with a hover event based on the context (e.g., the position, direction, and timing of the touches relative to the bendable portion 128 as well as the size of the bendable portion 128 and/or the radius of curvature of the bend within the bendable portion 128). If no hover event has been detected, touch-based user interactions are assumed such that the sensor analyzer 1108 treats each separate touch and release of the display 102 as a separate user interaction.

In some examples, an output of the sensor analyzer 1108 (e.g., indicating a touch event or a hover event) causes the user interface generator 1104 to update and/or change the content rendered on the display 102. In some examples, the user interface generator 1104 may modify the user interface rendered on the display 102 in response to the detection of a hover event within the bendable portion of the display. More particularly, in some examples, when a hover event is detected, the user interface generator 1104 generates a notification that the hover event was detected. In some examples, the notification includes an indication of the location determined for the detected hover event. Additionally or alternatively, in some examples, the detection of a hover event by the sensor analyzer 1108 may trigger other types of user notifications (e.g., audible, haptic, etc.) to indicate the hover event was detected.

In the illustrated example, the operations controller 1110 controls the operations of and interactions between the other elements of the display control system 1100 of FIG. 11 described above. Further, in some examples, the operations controller 1110 enables interactions with other components of the computing device 100. For instance, in some examples, the operations controller 1110 implements the audible and/or haptic user notifications based on the output of the sensor analyzer 1108 as described above. Further, in some examples, the operations controller 1110 implements a suitable response to user interaction with the display 102 detected by the sensor analyzer 1108.

While an example manner of implementing the display control system 1100 of FIG. 11 is illustrated in FIG. 11, one or more of the elements, processes and/or devices illustrated in FIG. 11 may be combined, divided, re-arranged, omitted, eliminated and/or implemented in any other way. Further, the example configuration analyzer 1102, the example user interface generator 1104, the example sensor controller 1106, the example sensor analyzer 1108, the example operations controller 1110, and/or, more generally, the example display control system 1100 of FIG. 11 may be implemented by hardware, software, firmware and/or any combination of hardware, software and/or firmware. Thus, for example, any of the example configuration analyzer 1102, the example user interface generator 1104, the example sensor controller 1106, the example sensor analyzer 1108, the example operations controller 1110 and/or, more generally, the example display control system 1100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration analyzer 1102, the example user interface generator 1104, the example sensor controller 1106, the example sensor analyzer 1108, and/or the example operations controller 1110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display control system 1100 of FIG. 11 may include one or more elements, processes and/or devices in addition to, or instead of, those illustrated in FIG. 11, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
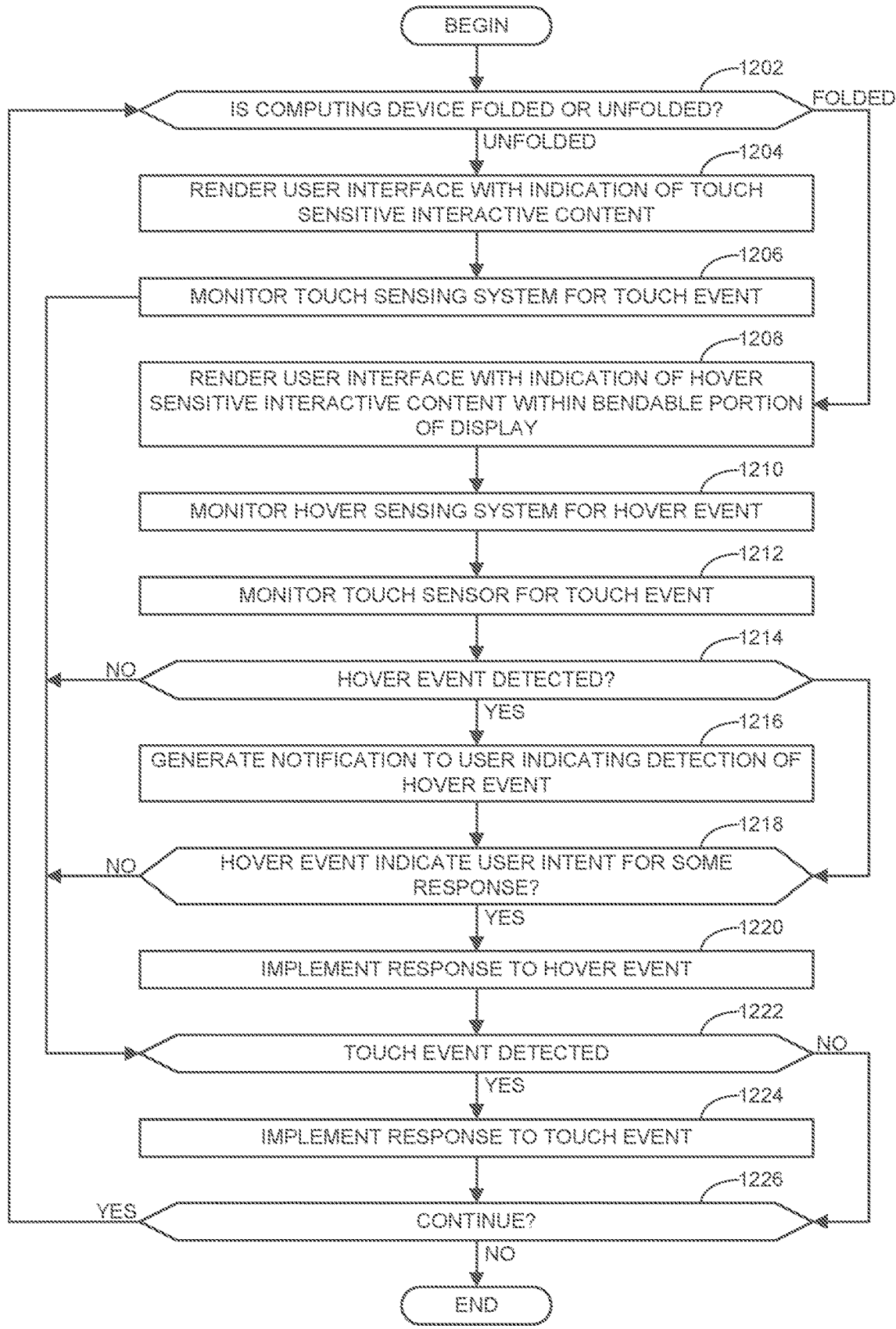
FIG. 12 is a flowchart representative of example machine readable instructions which may be executed to implement the example display control system of FIG. 11.

A flowchart representative of example hardware logic, machine readable instructions, hardware implemented state machines, and/or any combination thereof for implementing the display control system 1100 of FIG. 11 is shown in FIG. 12. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example display control system 1100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 12 begins at block 1202 where the example configuration analyzer 1102 determines whether the computing device 100 is folded or unfolded. That is, the example configuration analyzer 1102 determines whether the device 100 is in an unfolded configuration or a folded configuration. If the device is unfolded, control advances to block 1204 where the example user interface generator 1104 renders a user interface with an indication of touch sensitive interactive content. At block 1206, the example sensor analyzer 1108 monitors the touch sensing system for a touch event. Thereafter, control advances to block 1242.

Returning to block 1202, if the example configuration analyzer 1102 determines that the computing device 100 is folded, control advances to block 1208. The example program of FIG. 12 assumes that the hinge mechanism within the bendable portion 128 of the device 100 provides adequate support to the display 102 when in the unfolded configuration to allow a user to touch the display within the bendable portion 128 without appreciable risk of damage to the display such that hover sensing is unnecessary. If, however, hover sensing is to be employed regardless of the configuration of the device 100, then blocks 1202-1206 may be omitted with the example program beginning at block 1208. At block 1208, the example user interface generator 1104 renders a user interface with an indication of hover sensitive interactive content within the bendable portion of the display 102. At block 1210, the example sensor analyzer 1108 monitors the hover sensing system for a hover event. At block 1212, the example sensor analyzer 1108 monitors the touch sensing system for a touch event.

At block 1214, the example sensor analyzer 1108 determines whether a hover event is detected. If so, control advances to block 1216 where the example user interface generator 1104 and/or the operations controller 1110 generate a notification to the user indicating the detection of the hover event. Thereafter, control advances to block 1218. Returning to block 1214, if no hove event is detected, control advances directly to block 1242.

At block 1218, the example sensor analyzer 1108 determines whether the hover event indicates user intent for some response. That is, the example sensor analyzer 1108 determines whether the object detected as causing the user event (e.g., the user's finger, a stylus, etc.) is hovering over the display 102 to interact with content rendered on the display or is merely passing over the display. If the sensor analyzer 1108 determines the hover event indicates a user intent for some response, control advances to block 1220 where the example operations controller 1110 implements the response to the hover event. Thereafter, control advances to block

1222. Returning to block 1218, if there is no indication of user intent for some response, control advances directly to block 1222.

At block 1222, the example sensor analyzer 1108 determines whether a touch event has been detected. If so, control advances to block 1224 where the example operations controller 1110 implements a response to the touch event. Thereafter, control advances to block 1226. If, at block 1222, the sensor analyzer determines that no touch event has been detected, control advances directly to block 1226. At block 1226, the example program determines whether to continue. If so, control returns to block 1202. Otherwise, the example program of FIG. 12 ends.

Figure 13:
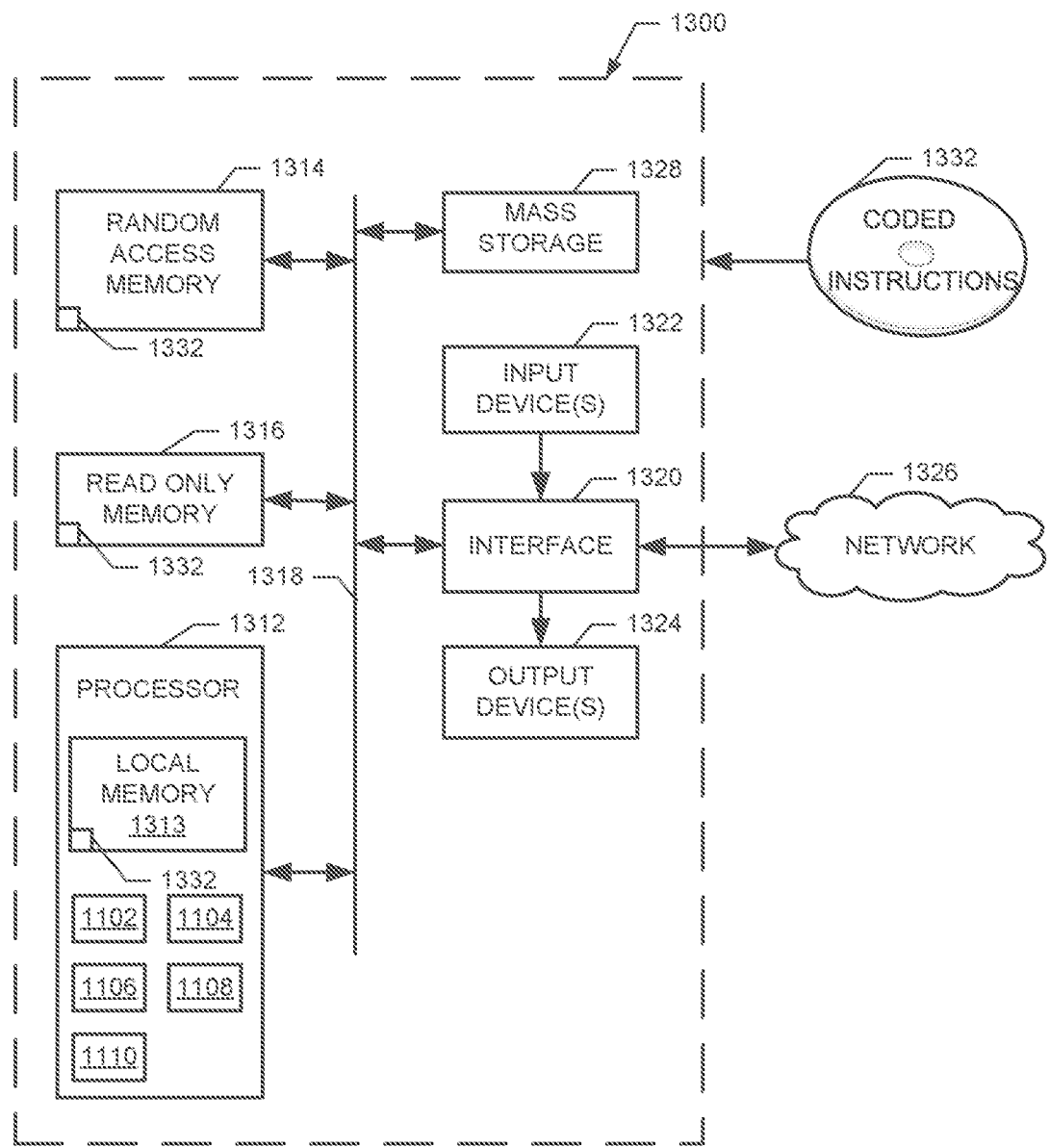
FIG. 13 is a block diagram of an example processing platform structured to execute the instructions of FIG. 12 to implement the example display control system of FIG. 11

FIG. 13 is a block diagram of an example processor platform 1300 structured to execute the instructions of FIG. 12 to implement the display control system 1100 of FIG. 11. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example configuration analyzer 1102, the example user interface generator 1104, the example sensor controller 1106, the example sensor analyzer 1108, and the example operations controller 1110.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 12 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that preserve the integrity of a foldable touchscreen and/or associated hinge mechanisms within a bendable portion of the device from damage due to forceful touching of the bendable portion of the display. This is achieved by enabling hover sensing within the bendable portion of the display to enable a user to interact with the display without touching it. In some examples, the hover sensing system is limited to the bendable portion to reduce manufacturing costs and also to reduce power and/or processing requirements to operate the display. The disclosed methods, apparatus and articles of manufacture are accordingly directed to one or more improvement(s) in the functioning of a computer.

Example methods, apparatus, systems, and articles of manufacture to facilitate user interactions with foldable displays are disclosed herein. Further examples and combinations thereof include the following:

Example 1 includes a computing device comprising a foldable display having a first region, a second region, and a bendable region between the first and second regions, a hover sensing system associated with the bendable region to detect a hover event, a touch sensing system associated with at least one of the first region or the second region to detect a touch event, and an operations controller to implement an action on the computing device responsive to at least one of the hover event or the touch event.

Example 2 includes the computing device of example 1, wherein the touch sensing system includes the hover sensing system.

Example 3 includes the computing device of example 1, wherein the hover sensing system is separate from the touch sensing system.

Example 4 includes the computing device of any one of examples 1-3, wherein the display includes a first display area associated with the first region and a second display area associated with the second region.

Example 5 includes the computing device of example 4, wherein the first display area shares a common border with the second display area, the border included within the bendable region of the display.

Example 6 includes the computing device of example 4, wherein the display includes a third display area associated with the bendable region, the third display area separating the first display area and the second display area.

Example 7 includes the computing device of any one of examples 4-6, further including a first touch IC to control at least one of the hover sensing system or the touch sensing system in the first display area, and a second touch IC to control at least one of the hover sensing system or the touch sensing system in the second display area.

Example 8 includes the computing device of any one of examples 4-7, further including a first display driver to control content rendered in the first display area, and a second display driver to control content rendered in the second display area.

Example 9 includes the computing device of any one of examples 4-8, wherein at least one of the hover sensing system or the touch sensing system includes an array of transmitters extending across the display in a first direction and an array of receivers extending across the display in a second direction, the first display area adjacent the second display area in the second direction, ones of the receivers extending across the first display area without extending across the second display area.

Example 10 includes the computing device of any one of examples 1-9, further including a user interface generator to render interactive content on the display, the interactive content having a first appearance in the first region and a second different appearance in the bendable region.

Example 11 includes the computing device of any one of examples 1-10, further including a user interface generator to render a graphical user interface on the display, and in response to the hover sensing system detecting the hover event, modify a portion of the graphical user interface corresponding to a location where the hover event was detected.

Example 12 includes the computing device of any one of examples 1-11, further including a configuration analyzer to determine whether the computing device is in a folded configuration or an unfolded configuration, and a sensor controller to activate the hover sensing system when the computing device is in the folded configuration and to deactivate the hover sensing system when the computing device is in the unfolded configuration.

Example 13 includes an apparatus comprising a sensor analyzer to detect a hover event via a hover sensing system included within a first region of a foldable display of a computing device, and detect a touch event via a touch sensing system included within a second region of the display separate from the first region, the second region spaced apart from the hover sensing system, and an operations controller to implement an action on the computing device responsive to at least one of the hover event or the touch event.

Example 14 includes the apparatus of example 13, wherein the touch sensing system is included within the first region of the display.

Example 15 includes the apparatus of example 14, wherein the touch sensing system includes the hover sensing system.

Example 16 includes the apparatus of example 14, wherein the hover sensing system is separate from the touch sensing system.

Example 17 includes the apparatus of any one of examples 13-16, wherein the first region corresponds to a bendable portion of the computing device and the second region corresponds to a rigid portion of the computing device.

Example 18 includes the apparatus of example 17, wherein the display includes a first display area and a second display area, the display foldable along the bendable portion such that the first display area faces the second display area.

Example 19 includes the apparatus of example 18, wherein the first display area shares a common border with the second display area, the border included within the bendable portion of the display.

Example 20 includes the apparatus of example 18, wherein the display includes a third display area separating the first display area and the second display area, the bendable portion of the display included within the third display area.

Example 21 includes the apparatus of any one of examples 18-20, wherein at least one of the hover sensing system or the touch sensing system in the first display area is controlled using a first touch IC and at least one of the hover sensing system or the touch sensing system in the second display area is controlled using a second touch IC different than the first touch IC.

Example 22 includes the apparatus of any one of examples 18-21, wherein a first display driver is associated with the first display area and a second display driver, different than the first display driver, is associated with the second display area.

Example 23 includes the apparatus of any one of examples 18-22, wherein at least one of the hover sensing system or the touch sensing system includes an array of transmitters extending across the display in a first direction and an array of receivers extending across the display in a second direction, the first display area adjacent the second display area in the second direction, ones of the receivers extending across the first display area without extending across the second display area.

Example 24 includes the apparatus of any one of examples 13-23, further including a user interface generator to render interactive content on the display, the interactive content having a first appearance in the first region and a second different appearance in the second region.

Example 25 includes the apparatus of any one of examples 13-24, further including a user interface generator to render a graphical user interface on the display, and in response to the sensor analyzer detecting the hover event, modify a portion of the graphical user interface corresponding to a location where the hover event was detected.

Example 26 includes the apparatus of any one of examples 13-25, further including a configuration analyzer to determine whether the computing device is in a folded configuration or an unfolded configuration, and a sensor controller to activate the hover sensing system when the computing device is in the folded configuration and to deactivate the hover sensing system when the computing device is in the unfolded configuration.

Example 27 includes a non-transitory computer readable medium comprising instructions that, when executed, cause a machine to at least detect a hover event via a hover sensing system included within a first region of a foldable display of a computing device, detect a touch event via a touch sensing system included within a second region of the display separate from the first region, the second region spaced apart from the hover sensing system, and implement an action on the computing device responsive to at least one of the hover event or the touch event.

Example 28 includes the non-transitory computer readable medium of example 27, wherein the touch sensing system is included within the first region of the display.

Example 29 includes the non-transitory computer readable medium of example 28, wherein the touch sensing system includes the hover sensing system.

Example 30 includes the non-transitory computer readable medium of example 28, wherein the hover sensing system is separate from the touch sensing system.

Example 31 includes the non-transitory computer readable medium of any one of examples 27-30, wherein the first region corresponds to a bendable portion of the computing device and the second region corresponds to a rigid portion of the computing device.

Example 32 includes the non-transitory computer readable medium of example 31, wherein the display includes a first display area and a second display area, the display foldable along the bendable portion such that the first display area faces the second display area.

Example 33 includes the non-transitory computer readable medium of example 32, wherein the first display area shares a common border with the second display area, the border included within the bendable portion of the display.

Example 34 includes the non-transitory computer readable medium of example 32, wherein the display includes a third display area separating the first display area and the second display area, the bendable portion of the display included within the third display area.

Example 35 includes the non-transitory computer readable medium of any one of examples 32-34, wherein at least one of the hover sensing system or the touch sensing system in the first display area is controlled using a first touch IC and at least one of the hover sensing system or the touch sensing system in the second display area is controlled using a second touch IC different than the first touch IC.

Example 36 includes the non-transitory computer readable medium of any one of examples 32-35, wherein a first display driver is associated with the first display area and a second display driver, different than the first display driver, is associated with the second display area.

Example 37 includes the non-transitory computer readable medium of any one of examples 32-36, wherein at least one of the hover sensing system or the touch sensing system includes an array of transmitters extending across the display in a first direction and an array of receivers extending across the display in a second direction, the first display area adjacent the second display area in the second direction, ones of the receivers extending across the first display area without extending across the second display area.

Example 38 includes the non-transitory computer readable medium of any one of examples 27-37, wherein the instructions further cause the machine to render interactive content on the display, the interactive content having a first appearance in the first region and a second different appearance in the second region.

Example 39 includes the non-transitory computer readable medium of any one of examples 27-38, wherein the instructions further cause the machine to render a graphical user interface on the display, and in response to detection of the hover event, modify a portion of the graphical user interface corresponding to a location where the hover event was detected.

Example 40 includes the non-transitory computer readable medium of any one of examples 27-39, wherein the instructions further cause the machine to determine whether the computing device is in a folded configuration or an unfolded configuration, activate the hover sensing system when the computing device is in the folded configuration, and deactivate the hover sensing system when the computing device is in the unfolded configuration.

Example 41 includes a method comprising detecting, by executing an instruction with a processor, a hover event via a hover sensing system included within a first region of a foldable display of a computing device, detecting, by executing an instruction with the processor, a touch event via a touch sensing system included within a second region of the display separate from the first region, the second region spaced apart from the hover sensing system, and implementing an action on the computing device responsive to at least one of the hover event or the touch event.

Example 42 includes the method of example 41, wherein the touch sensing system is included within the first region of the display.

Example 43 includes the method of example 42, wherein the touch sensing system includes the hover sensing system.

Example 44 includes the method of example 42, wherein the hover sensing system is separate from the touch sensing system.

Example 45 includes the method of any one of examples 41-44, wherein the first region corresponds to a bendable portion of the computing device and the second region corresponds to a rigid portion of the computing device.

Example 46 includes the method of example 45, wherein the display includes a first display area and a second display area, the display foldable along the bendable portion such that the first display area faces the second display area.

Example 47 includes the method of example 46, wherein the first display area shares a common border with the second display area, the border included within the bendable portion of the display.

Example 48 includes the method of example 46, wherein the display includes a third display area separating the first display area and the second display area, the bendable portion of the display included within the third display area.

Example 49 includes the method of any one of examples 46-48, wherein at least one of the hover sensing system or the touch sensing system in the first display area is controlled using a first touch IC and at least one of the hover sensing system or the touch sensing system in the second display area is controlled using a second touch IC different than the first touch IC.

Example 50 includes the method of any one of examples 46-49, wherein a first display driver is associated with the first display area and a second display driver, different than the first display driver, is associated with the second display area.

Example 51 includes the method of any one of examples 46-50, wherein at least one of the hover sensing system or the touch sensing system includes an array of transmitters extending across the display in a first direction and an array of receivers extending across the display in a second direction, the first display area adjacent the second display area in the second direction, ones of the receivers extending across the first display area without extending across the second display area.

Example 52 includes the method of any one of examples 41-51, further including rendering interactive content on the display, the interactive content having a first appearance in the first region and a second different appearance in the second region.

Example 53 includes the method of any one of examples 41-52, further including rendering a graphical user interface on the display, and in response to detection of the hover event, modifying a portion of the graphical user interface corresponding to a location where the hover event was detected.

Example 54 includes the method of any one of examples 41-53, further including determining whether the computing device is in a folded configuration or an unfolded configuration, activating the hover sensing system when the computing device is in the folded configuration, and deactivating the hover sensing system when the computing device is in the unfolded configuration.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electronic device comprising:
    a display;
    an array of transmitters to extend across the display in a first direction;
    an array of receivers to extend across the display in a second direction different than the first direction, the transmitters and receivers to enable detection of at least one of a hover event or a touch event in an area of the display, a first subset of the receivers to extend across a first non-bendable portion of the display without extending into a second non-bendable portion of the display, a second subset of the receivers to extend across the second non-bendable portion of the display without extending into the first non-bendable portion of the display;
    a first touch IC to communicate with the first subset of the receivers to facilitate the detection of the at least one of the hover event or the touch event when the area is associated with the first non-bendable portion of the display; and
    a second touch IC to communicate with the second subset of the receivers to facilitate the detection of the at least one of the hover event or the touch event when the area is associated with the second non-bendable portion of the display, the second touch IC distinct from the first touch IC.

2. The electronic device of claim 1, wherein the display includes a bendable portion between the first and second non-bendable portions.

3. The electronic device of claim 2, wherein the bendable portion of the display extends between opposite edges of the display along a fold line, the display to bend along the fold line to enable the first non-bendable portion of the display to face toward the second non-bendable portion of the display.

4. The electronic device of claim 3, wherein the second direction is transverse to the fold line.

5. A compute device comprising:
    a foldable display having a bendable region, the foldable display having a folded configuration and an unfolded configuration; and
    circuitry to:
        activate a hover sensing system associated with the bendable region when the foldable display is in the folded configuration, and to deactivate the hover sensing system when the foldable display is in the unfolded configuration.

6. The compute device of claim 5, further including processor circuitry programmed to identify touch events in a non-bendable region of the foldable display based on a touch sensing system.

7. The compute device of claim 6, wherein the touch sensing system extends across the bendable region of the foldable display.

8. The compute device of claim 6, wherein the touch sensing system includes the hover sensing system.

9. The compute device of claim 6, wherein the hover sensing system is separate and distinct from the touch sensing system.

10. The compute device of claim 5, wherein the foldable display includes a first display area associated with a first non-bendable region of the foldable display, a second display area associated with a second non-bendable region of the foldable display, and a third display area associated with the bendable region, the third display area positioned between the first and second display areas.

11. The compute device of claim 10, further including processor circuitry to cause presentation of interactive content on the foldable display, the interactive content having a first appearance in the first display area and a second appearance in the second display area, the first appearance different than the second appearance.

12. An electronic device comprising:
    means for displaying content;
    means for enabling the displaying means to bend along a first region of the displaying means; and
    means for processing to generate interactive content on the displaying means, a first item of the interactive content to have a first appearance when generated for the first region of the displaying means the first item of the interactive content to have a second appearance when generated for a second region of the displaying means, the second region positioned alongside the first region, the first appearance different than the second appearance.

13. The electronic device of claim 12, wherein the first appearance differs from the second appearance based on a three-dimensional effect associated with the first appearance of the first item of the interactive content.

14. The electronic device of claim 12, further including means for sensing at least one of a hover event or a touch event in an area of the displaying means, the processing means to implement an action in response to the at least one of the hover event or the touch event.

15. The electronic device of claim 14, wherein the sensing means includes means for sensing the hover event and means for sensing the touch event, the hover event sensing means distinct from the touch event sensing means.

16. An electronic device comprising:
    means for displaying interactive content;
    means for enabling the displaying means to bend along a first region of the displaying means;
    means for sensing a hover event in an area of the displaying means;
    means for sensing a touch event in the area of the displaying means, the hover event sensing means distinct from the touch event sensing means; and
    means for processing to:
        generate the interactive content for the displaying means; and
        deactivate the hover event sensing means when the displaying means is in an unfolded configuration.

17. The electronic device of claim 12, wherein the displaying means includes a third region positioned alongside the first region, the first region between the second and third regions, the second and third regions being non-bendable.

18. The electronic device of claim 17, further including:
   first means for controlling display of the interactive content in a first area of the displaying means; and
   second means for controlling display of the interactive content in a second area of the displaying means, the first area distinct from the second area, the first display controlling means distinct from the second display controlling means.

19. The electronic device of claim 18, wherein the first area includes the second region and extends into the first region, and the second area includes the second region and extends into the first region.

\* \* \* \* \*